Figure 1:
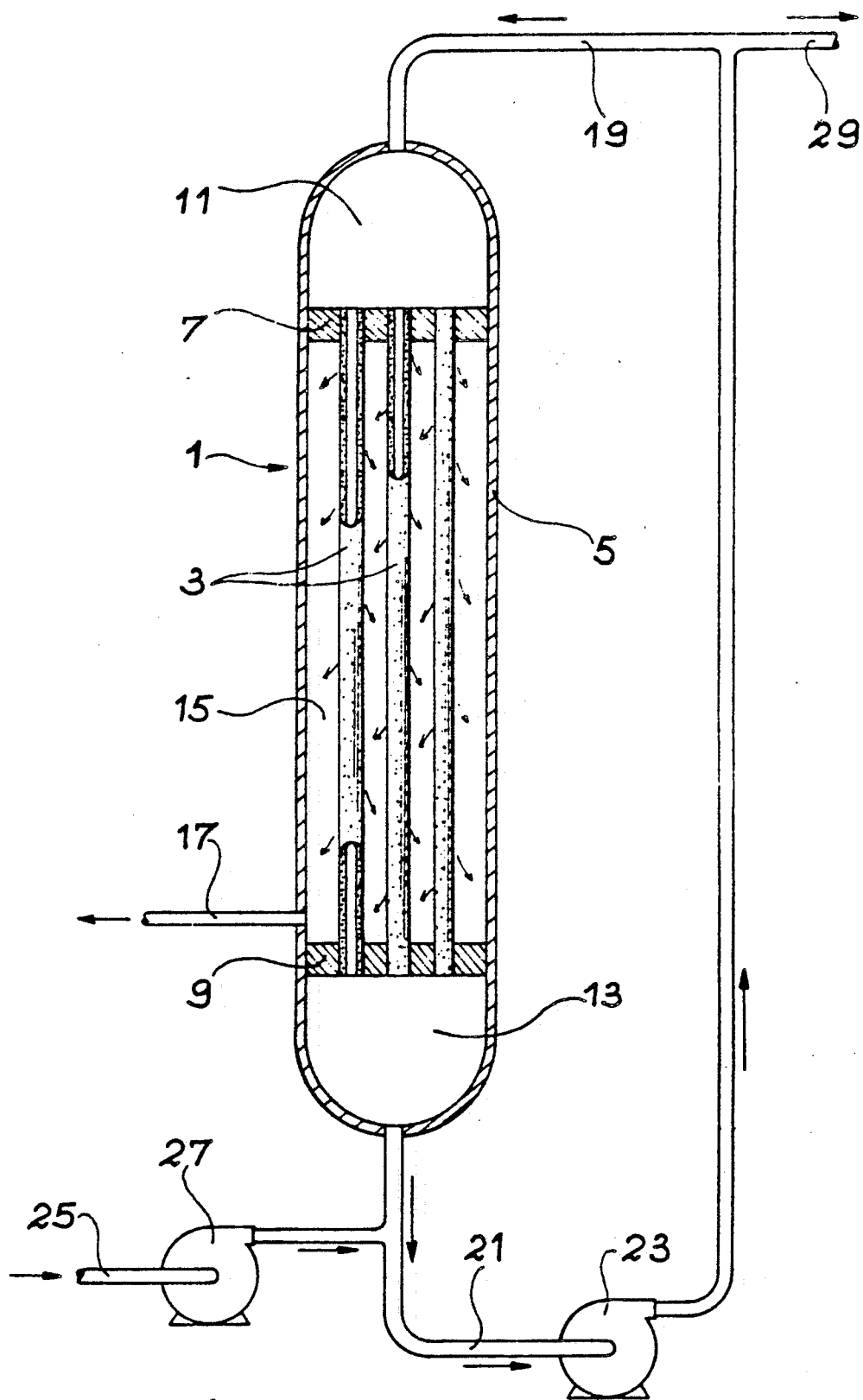

United States Patent [19]

Chaufer et al.

[11] Patent Number: 4,992,178
[45] Date of Patent: Feb. 12, 1991

[54] INORGANIC ULTRAFILTRATION OF MICROFILTRATION MEMBRANE MODIFIED BY A HYDROPHILIC POLYMER, ITS PREPARATION PROCESS AND ITS USE FOR THE SEPARATION OF PROTEINS

[75] Inventors: Bernard Chaufer, Champigny; Jacqueline Dulieu, Malakoff; Sebille, Pierre Louvier, all of France

[73] Assignees: Tech-Sep, Courbevoie; Electricite de France (Service National), Paris, both of France

[21] Appl. No.: 278,926

[22] PCT Filed: Feb. 25, 1988

[86] PCT No.: PCT/FR88/00107
§ 371 Date: Dec. 19, 1988
§ 102(e) Date: Dec. 19, 1988

[87] PCT Pub. No.: WO88/06477
PCT Pub. Date: Sep. 7, 1988

[30] Foreign Application Priority Data
Feb. 26, 1987 [FR] France .................. 8702574

[51] Int. Cl.$^5$ ............................................. B01D 13/00
[52] U.S. Cl. ................................... 210/651; 210/490; 210/500.37; 210/500.38
[58] Field of Search ............ 210/639, 500.35, 500.38, 210/490, 651, 500.37; 427/245, 246

[56] References Cited

U.S. PATENT DOCUMENTS

| | | | |
|---|---|---|---|
| 3,061,518 | 10/1962 | Auerswald et al. | 167/78 |
| 4,125,462 | 11/1978 | Latty | 210/23 F |
| 4,250,029 | 2/1981 | Kiser et al. | 210/500.35 X |
| 4,762,619 | 8/1988 | Gaddis et al. | 210/639 |
| 4,780,210 | 10/1988 | Hsia | 210/634 X |

FOREIGN PATENT DOCUMENTS

| | | | |
|---|---|---|---|
| 0232442 | 4/1978 | European Pat. Off. | |
| 2388583 | 11/1978 | European Pat. Off. | |
| 0022696 | 1/1981 | European Pat. Off. | |
| 0040282 | 11/1981 | European Pat. Off. | |
| 0175668 | 3/1986 | European Pat. Off. | |
| 0190558 | 4/1986 | European Pat. Off. | |
| 0250327 | 12/1987 | European Pat. Off. | |
| 2424756 | 11/1979 | France | |
| 0150803 | 8/1985 | Japan | 210/500.35 |
| 1255268 | 12/1971 | United Kingdom | 210/639 |

*Primary Examiner*—Frank Spear
*Attorney, Agent, or Firm*—Oblon, Spivak, McClelland, Maier & Neustadt

[57] ABSTRACT

The invention relates to inorganic ultrafiltration or microfiltration membranes, which are modified by adsorbing on one of the faces of said membrane at least one hydrophilic polymer or copolymer, such as polyvinylpyrrolidone or polyvinylimidazole. The inorganic membrane can comprise a macroporous support coated with a microporous metal oxide layer, such as zirconia or alumina.

These membranes (3) can be used in the ultrafiltration apparatus (1) for carrying out the separation of proteins such as proteins of latoserum, bovine serum albumin or lysozyme.

16 Claims, 6 Drawing Sheets

INORGANIC ULTRAFILTRATION OF MICROFILTRATION MEMBRANE MODIFIED BY A HYDROPHILIC POLYMER, ITS PREPARATION PROCESS AND ITS USE FOR THE SEPARATION OF PROTEINS

The present invention relates to ultrafiltration or microfiltration membranes more particularly usable for the separation of proteins.

More specifically, it applies to membranes having a separating layer of a microporous organic material, e.g. membranes constituted by a macroporous support coated with a microporous layer giving the desired separation characteristics to the membrane. In this case, the macroporous support can be made from different inorganic materials, e.g. of carbon or metal oxide. The microporous layer can be constituted by one or more metal oxides, e.g. zirconia, alumina or aluminous spinels, carbides, fluorides, etc.

Although inorganic ultrafiltration or microfiltration membranes have satisfactory characteristics for a large number of separations, the aim is to improve the separation performance characteristics of such membranes and possibly their selectivity with a view to the use thereof for protein separation.

Liquid phase separation processes using membranes and involving reverse osmosis, electrodialysis, ultrafiltration and similar methods have been studied to a significant extent over the past few years. The membranes used can be made from an organic or an inorganic material. Organic membranes for the deionization of liquids by reverse osmosis are e.g. described in French Patent No. 2 388 583 and U.S. Pat. No. 4 125 462. These Patents make use of organic membranes which are coated with a charged polyelectrolyte layer, such as a charged hydrophilic polymer, in order to give them the property of repelling certain ions, such as cations. In this case, the polymer cationic polyelectrolyte layer must have a molecular mass, e.g. exceeding 100 000 and preferably exceeding 500 000, in order to obtain the desired ion rejection or repulsion characteristics.

For the separation of proteins by ultrafiltration, it is possible to use inorganic or organic membranes as described in European Patent No. 22 696, or organic polymer membranes, as described in European Patent No. 190 558.

When using organic polymer membranes, problems are encountered in carrying out a separation on an industrial scale, because these polymer membranes generally have inadequate mechanical performance characteristics. Moreover, it is preferable to use inorganic membranes, which have superior mechanical properties.

However, the use of inorganic membranes causes other problems because the separating layers of said membranes and which are often oxide based, is not completely inert. Thus, the latter is obtained from highly active, finely divided particles and it still has surface charges, which make it sensitive to mineral salts. In addition, in operation, mineral salts can clog the finer pores.

The invention relates to an inorganic membrane usable for the separation of proteins, which is as effective as organic membranes without being sensitive to the action of mineral salts and which also has better mechanical properties and in certain cases an improved selectivity for separation of proteins.

The inorganic ultrafiltration or microfiltration membrane according to the invention has an inorganic material separating layer and is characterized in that it comprises, prior to being used for an ultrafiltration or microfiltration operation, at least one hydrophilic copolymer or polymer having a molecular mass at the most equal to $10^5$, adsorbed on or in the separating layer of the inorganic membrane with a view to modifying the separating properties.

In the membrane according to the invention, the hydrophilic polymer with a molecular mass below $10^5$ adsorbed on or in the separating layer of the inorganic membrane, makes it possible to neutralize the residual charges of said separating layer and make it insensitive to clogging by mineral salts. Moreover, the choice of an appropriate hydrophilic copolymer or polymer makes it possible to modify the conditions of transfer of proteins through the ultrafiltration or microfiltration membrane and to vary certain properties of the membrane such as its selectivity with respect to solutes, its permeation flow rate or its rejection rate for one or more solutes.

The use of a hydrophilic polymer or copolymer with a molecular mass at the most equal to $10^5$ and preferably between $10^4$ and $10^5$ makes it possible for the polymer to penetrate the pores of the membrane in order to modify the properties. Thus, an ultrafiltration membrane is obtained, which has the mechanical properties of the inorganic membrane and improved separating properties.

Moreover, after using such membranes for ultrafiltration, it is possible to regenerate them by carrying out washing operations with water and/or alkaline and acid solutions at ambient temperature, whereas in the case of inorganic membranes not modified according to the invention, it is necessary to carry out washing at 80° C. in order to obtain the initial permeability.

It is pointed out that the term hydrophilic polymer or copolymer is understood to refer to a polymer or copolymer having groups with an affinity for water. It is also pointed out that throughout the remainder of the text the term "polymer" is used for designating both homopolymers and copolymers.

According to the invention, the hydrophilic polymers used can be in particular constituted by polymers having amide or amine functions. When using polymers with amide functions, the latter are preferably N-disubstituted amide functions and examples of such polymers are polyvinylpyrrolidone and disubstituted derivatives of polyacrylamides and polymethacrylamides.

The hydrophilic polymers having amine functions can e.g. be constituted by polyvinylimidazole, polyvinylamine, polyethylene imine and polymers which have been functionalized so as to have amine groups, such as polymers obtained from polyacrylic or polymethacrylic acids and esters or polyacrylamides which have been functionalized by reaction with ethylene diamine, with polyethylene amines such as tetraethylenepentamine and triethylenetetramine, with diethanolamine or with N-iminodiacetic acid derivatives.

When using hydrophilic polymers with an amine function, it is also possible to quaternize these amine functions to form cationic polymers, which in certain cases can be of greater interest than the initial polymers.

The inorganic material ultrafiltration or microfiltration membranes used in the invention can be of different types. However, preference is generally given to membranes constituted by an inorganic macroporous support on which has been deposited an inorganic microporous layer. The macroporous support can e.g. be of carbon or a metal oxide such as alumina and the microporous layer can be of a metal oxide, e.g. alumina or zirconia, metal carbide, metal fluoride, or spinel. The separating properties of these ultrafiltration membranes are thus conditioned by the porosity and permeability characteristics of the microporous layer and, according to the invention, these properties are improved by modifying the surface of the microporous layer by the adsorption of a hydrophilic polymer.

In general, to obtain a significant improvement to the properties of the ultrafiltration or microfiltration membrane, the hydrophilic polymer and/or copolymer quantity adsorbed is approximately 7 to 400 $\mu g/cm^2$ of membrane.

To characterize the modification obtained, it is possible to carry out a flow rate measurement with water on the unmodified inorganic ultrafiltration membrane and a flow rate measurement with water on said membrane following the adsorption of the hydrophilic polymer or copolymer. These measurements performed under a pressure of 4 bars (0.4 MPa) at 25° C. give the flow rate of the water DE prior to the adsorption of the copolymer and the flow rate of the water DE' following adsorption. It is known that this flow rate, for a fixed pressure, is dependent on the mean pore radius to a power of 4 according to Poiseuille's law. For example with inorganic membranes having e.g. an average pore radius $\bar{r}$ of approximately 50 to 100 Angstroms and water flow rates before adsorption of the hydrophilic polymer of 300 to 800 L/h.m$^2$, the ratio DE'/DE is 0.5 to 0.7, which means that the mean pore radius $\bar{r}'$ of the inorganic membrane after adsorption is lower than $\bar{r}$, the ratio $\bar{r}'/\bar{r}$ being 0.84 to 0.91.

The invention also relates to a process for the preparation of an ultrafiltration membrane modified by a hydrophilic polymer or copolymer. This process consists of contacting the inorganic material separating layer of an inorganic ultrafiltration or microfiltration membrane with a solution of at least one hydrophilic polymer or copolymer having a molecular mass at the most equal to $10^5$ for a time adequate to adsorb the hydrophilic polymer or copolymer on or in the separating layer of the inorganic membrane.

Thus, as has been shown hereinbefore, the hydrophilic polymer or copolymer adsorbed on or in the separating layer must not clog the small pores of the inorganic material separating layer and for this reason use is made of a hydrophilic polymer or copolymer with a molecular mass at the most equal to $10^5$.

In general, to facilitate the adsorption of the hydrophilic polymer in the surface pores of the ultrafiltration membrane, the latter is firstly conditioned in a solvent, preferably identical to that which will subsequently be used for producing the hydrophilic polymer or copolymer solution. This makes it possible to saturate the inorganic membrane with the solvent and thus facilitate the adsorption of the hydrophilic polymer. Examples of usable solvents are methanol and water.

Following the contacting of the ultrafiltration membrane with the hydrophilic polymer solution, the treated membrane undergoes rinsing and this can be carried out with different solvents. The aim of this operation is to eliminate the polymer adsorbed in a reversible manner on the inorganic membrane. This rinsing can e.g. be carried out with methanol and then with water.

The stages of adsorbing the hydrophilic polymer and rinsing can be carried out by conventional means. Thus, when the ultrafiltration membrane is tubular, it is possible to circulate within the tube the solution of the hydrophilic polymer and to carry out the rinsing in the same way by applying the same pressure on either side of the wall of the tube.

In this process, the circulation flow rates of the solution, the polymer concentrations of the solution and the contacting time are chosen as a function of the nature of the inorganic membrane and of the polymer used, so as to obtain the desired adsorption rates.

The adsorption isotherms obtained from the generally used polymers show that the latter have a high affinity for inorganic membranes and that the adsorption equilibrium can be very rapidly reached.

The inorganic microfiltration or ultrafiltration membranes modified by a hydrophilic polymer according to the invention can be used for the separation of proteins by ultrafiltration. These proteins can in particular be proteins of lactoserum, such as beta-lactoglobulin and alpha-lactalbumin, bovine serum albumin and lysozyme.

In order to carry out these separations, the solution of proteins to be separated is circulated along the face of the membrane on which is adsorbed the hydrophilic polymer or copolymer and on the other side of the membrane is collected either a protein-free solution, or a solution enriched with certain proteins of the starting solution. In the case of lactoserum, the use of inorganic membranes modified by hydrophilic polymers such as polyvinylpyrrolidone makes it possible to obtain a solution highly enriched with lactalbumin in the permeate.

The installations which can be used for carrying out these protein separations are of a conventional nature, such as those conventionally used for ultrafiltration.

Other features and advantages of the invention can be better gathered from the following description relative to illustrative and non-limitative exemplified embodiments and with reference to the attached drawings, wherein show:

FIG. 1 diagrammatically an ultrafiltration installation.

Figure 2:
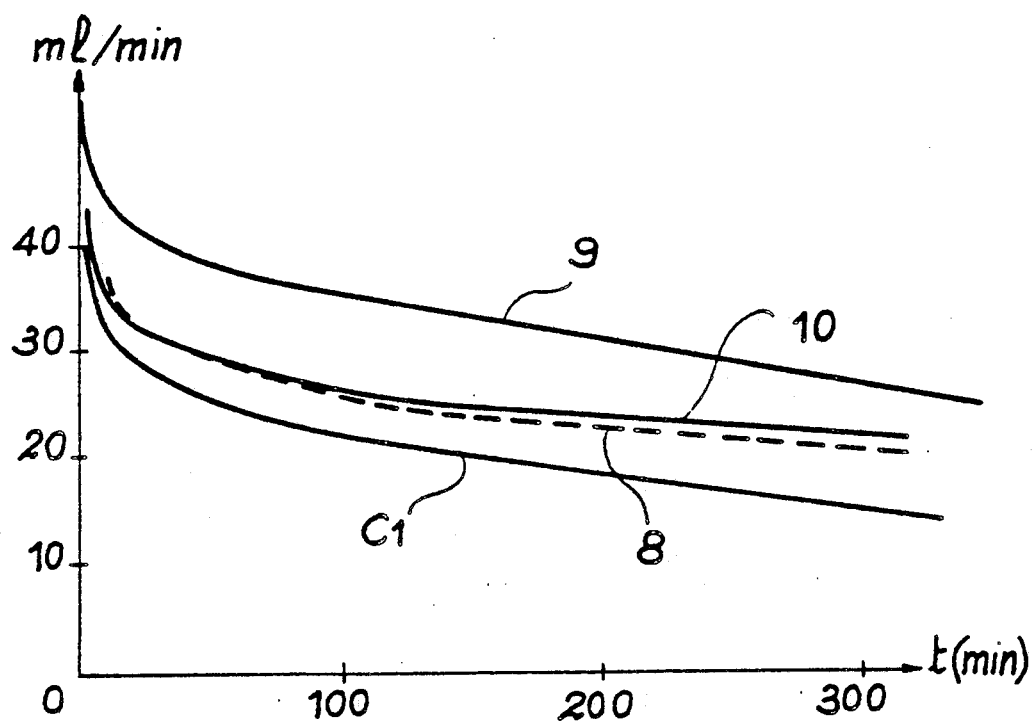

FIG. 2 a graph showing the evolution of the ultrafiltration flow rate (in ml/min) as a function of time (in min) during the ultrafiltration of lactoserum by means of membranes according to the invention.

Figure 3:
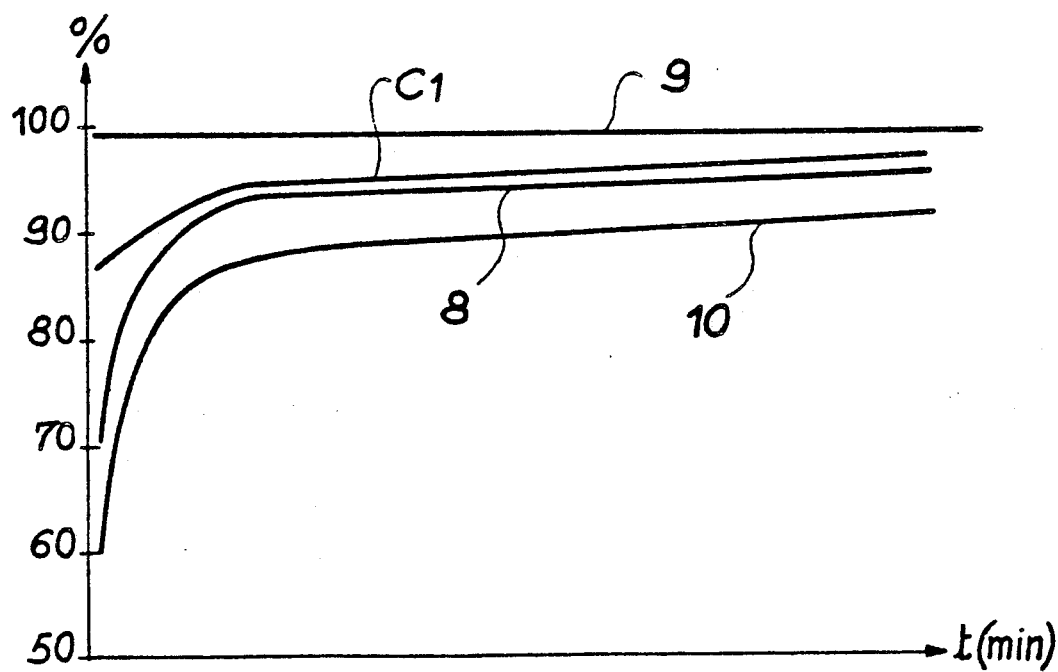

FIG. 3 a graph showing the evolution of the rejection rate (in %) of alpha-lactalbumin as a function of time (in min) during the ultrafiltration of lactoserum using membranes according to the invention.

Figure 4:
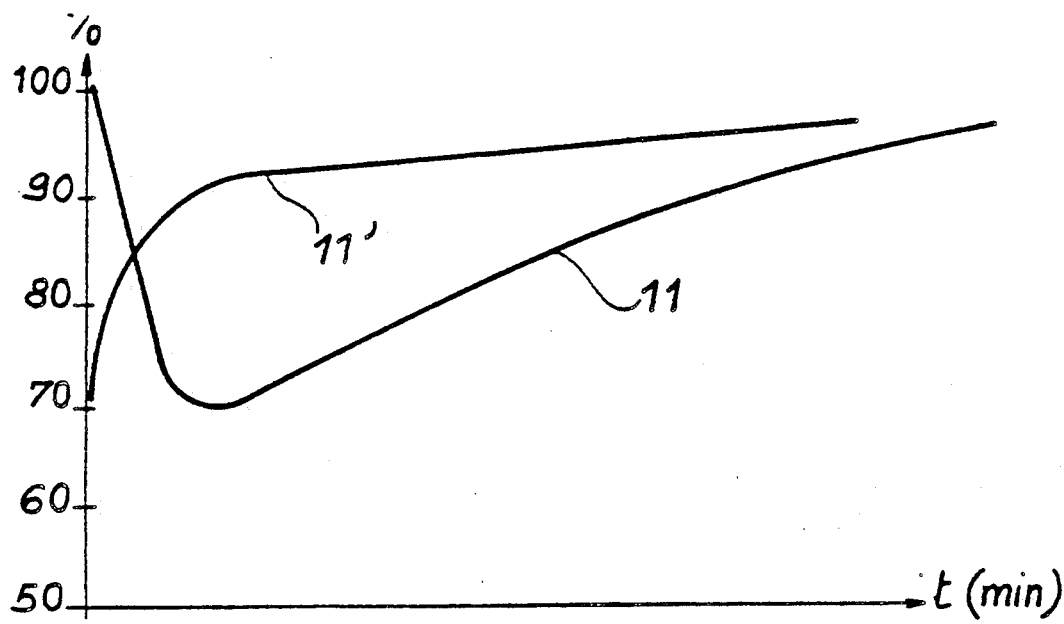

FIG. 4 the evolution of the alpha-lactalbumin retention rate as a function of time during the ultrafiltration of lactoserum by means of an inventive membrane.

Figure 5:
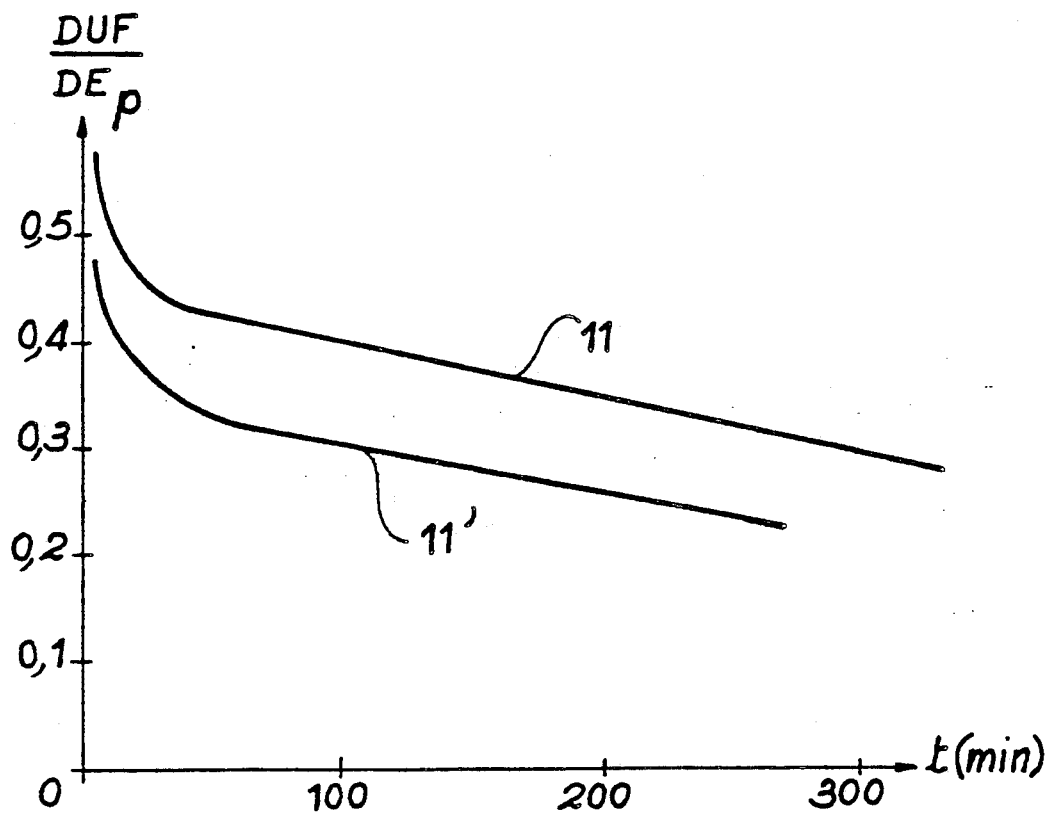

FIG. 5 the evolution of the permeate flow rate DUF/DE$_P$ as a function of time during the ultrafiltration of lactoserum by means of an inventive membrane.

Figure 6:
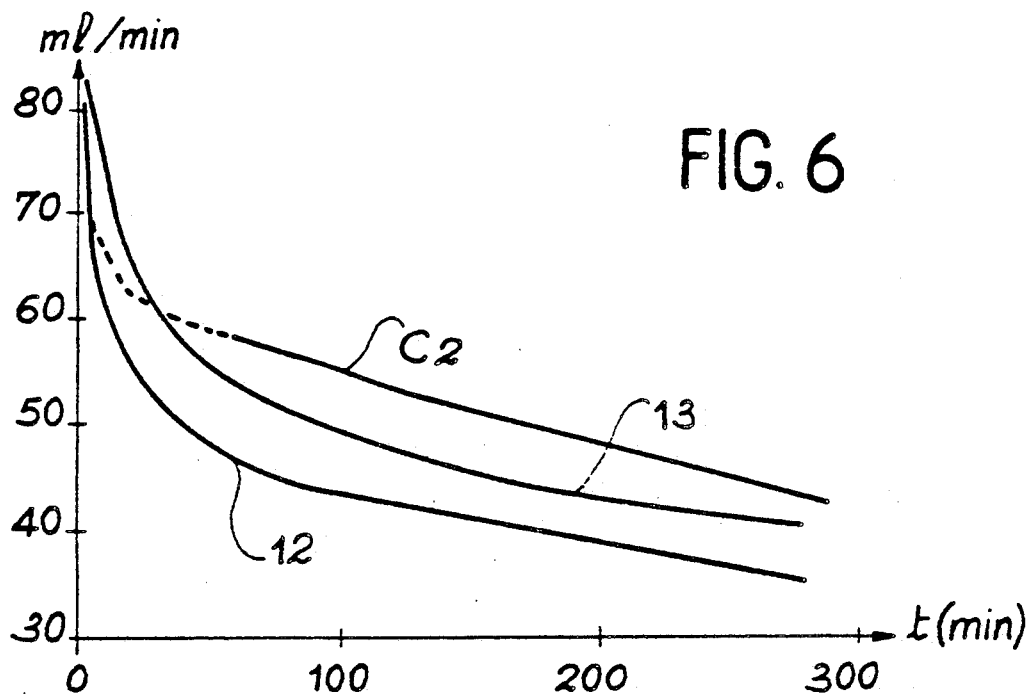

FIG. 6 a graph showing the evolution of the ultrafiltration flow rates as a function of time (in min) during the ultrafiltration of a bovine serum albumin solution using membranes according to the invention.

Figure 7:
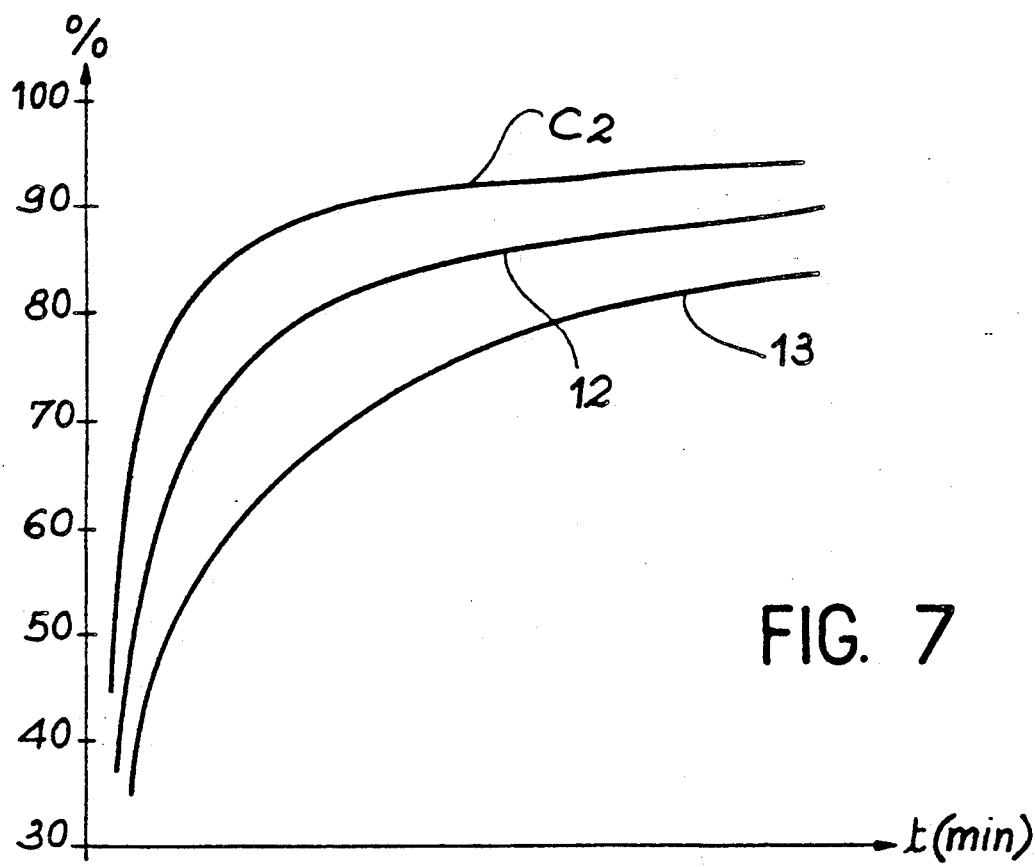

FIG. 7 a graph showing the evolution of the rejection rate (in %) of bovine serum albumin as a function of time (in min) for different membranes according to the invention.

Figure 8:
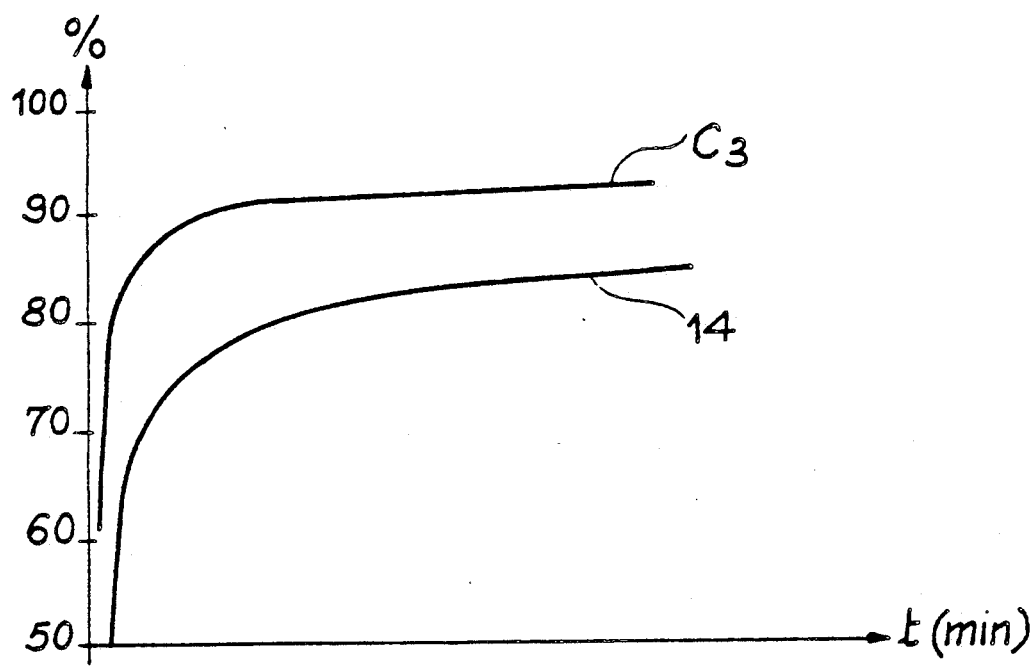

FIG. 8 a graph showing the evolution of the rejection rate (in %) of lysozyme as a function of time (in min) with a membrane according to the invention.

Figure 9:
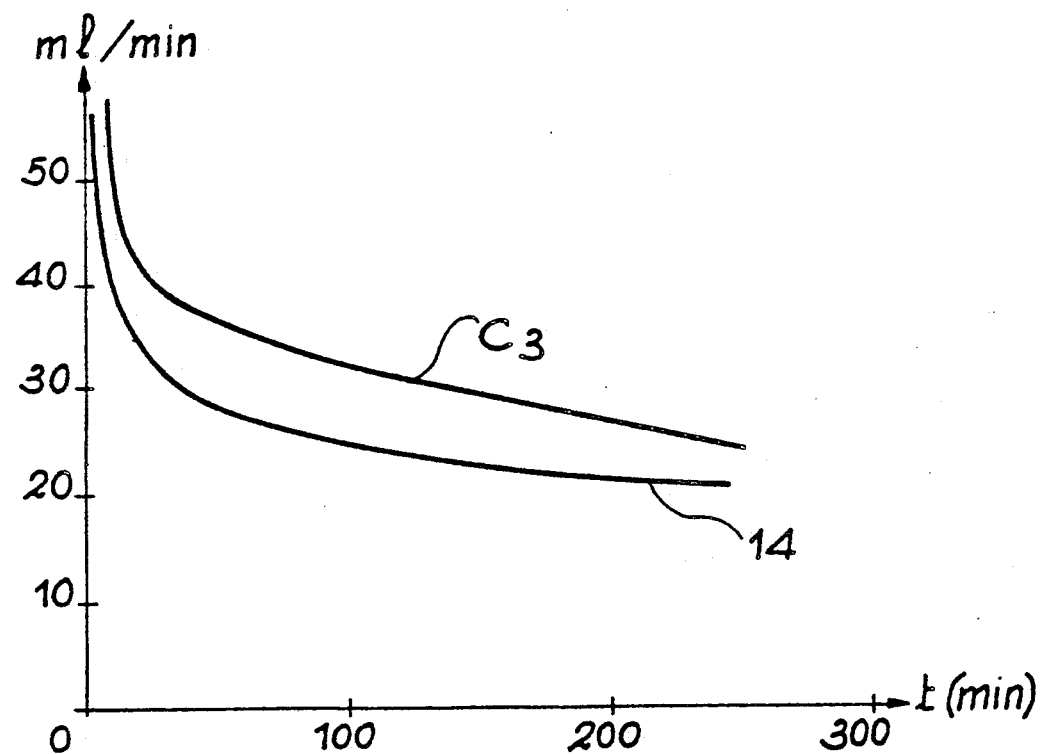

FIG. 9 a graph showing the evolution of the ultrafiltration flow rate (in mL/min) as a function of time (in min) during the ultrafiltration of a lysozyme solution with a inventive membrane.

Figure 10:
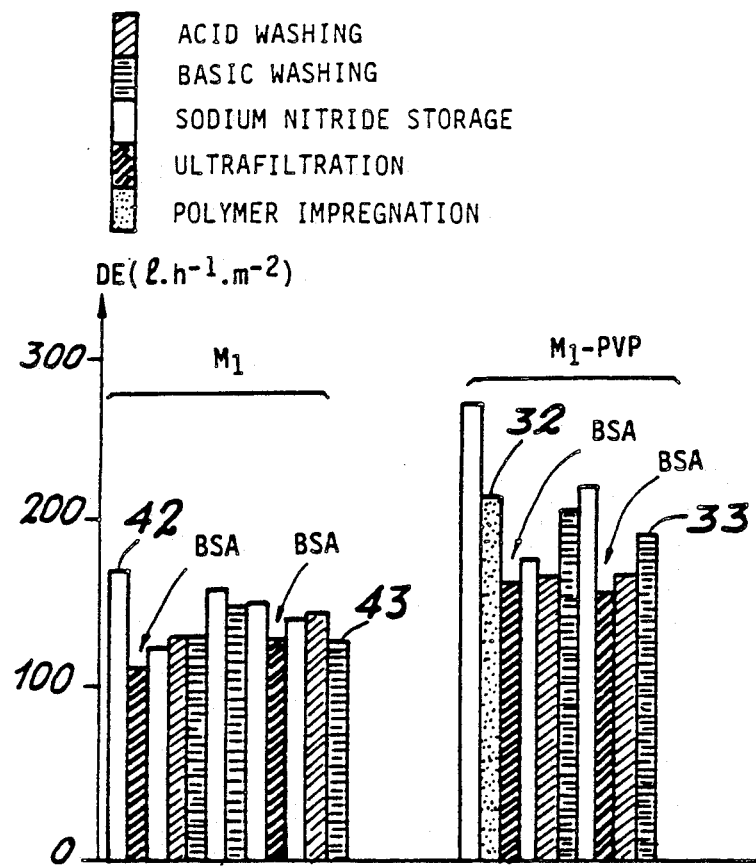
Figure 11:
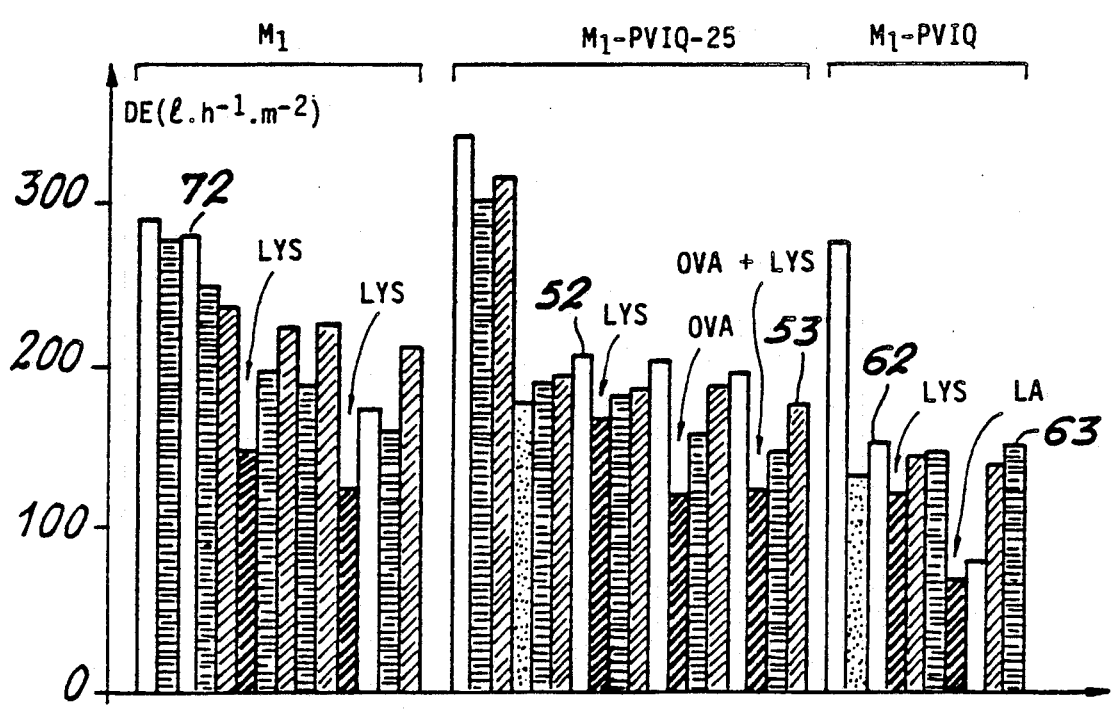

FIGS. 10 and 11 graphs giving the water flow rates of membranes according to the invention subjected to several regeneration treatments after various ultrafiltration operations.

In FIGS. 10 and 11, the symbols used have the following meanings:

| | |
|---|---|
| BSA: | bovine serum albumin |
| LYS: | lysozyme |
| OVA: | ovalbumin |
| PVIQ: | quaternized polyvinylimidazole. |
| PVIQ25: | quaternized vinylpyrrolidone-vinylimidazole copolymer (75/25), |
| LA: | fresh lactoserum (20 g/l). |

EXAMPLE 1

In this example, a polyvinylpyrrolidone (PVP)-modified ultrafiltration membrane is prepared.

The starting product is a tubular ultrafiltration membrane $M_1$ of porous carbon internally coated with a microporous $ZrO_2$ layer able to retain chemical compounds having a molecular mass higher than 70 000 daltons. The length of the tube is 1.20 m and its internal diameter is 0.6 cm. The mean pore radius of the microporous layer is approximately 5 nm and its permeability to water is 50 $L.h^{-1}.m^{-2} bar^{-1}$.

Methanol is circulated in the tube in order to saturate the microporous layer. After emptying the methanol, within the tube is circulated 150 ml of a solution of PVP in methanol containing 0.108 g/L of polyvinylpyrrolidone and the solution is circulated in the tube at a rate of 75 mL/min for approximately 30 minutes whilst recycling at the tube inlet the solution leaving the tube, including the permeate, i.e. the solution which has defused through the tube wall. For this adsorption operation, the pressure on either side of the tube wall is atmospheric pressure.

Following this operation, the tube is rinsed twice with pure methanol, then twice with pure water using for each rinsing operation 75 ml of methanol or water which is circulated within the tube, as hereinbefore, at a flow rate of 75 ml/min for 15 minutes.

At the end of the operation, the quantity of polyvinylpyrrolidone adsorbed is determined on the basis of measurements of the polyvinylpyrrolidone content in the collected solutions, including the permeates, following the adsorption and rinsing operations. The results are given in Table 1.

Thus, 3 mg of polyvinylpyrrolidone were irreversibly adsorbed on the tube, which corresponds to 13.6 $\mu g/cm^2$ of tube surface.

EXAMPLE 2

The operating procedure of example 1 is repeated, but the starting membrane $M_1$ is a 15 cm long and 0.6 cm internal diameter tube. Adsorption is carried out as in example 1, but using 50 ml of a PVP solution in methanol containing 0.101 g/L of PVP. This is followed by rinsing operations under the same conditions as those of example 1, except that use is made of 50 ml of methanol or water for each rinsing operation. As in example 1, the PVP contents of the collected solutions, including the permeates are determined. The results are given in Table 1.

Thus, the polyvinylpyrrolidone quantity adsorbed in irreversible manner is 0.19 mg, which corresponds to 7 $\mu g/cm^2$ of tube surface.

EXAMPLE 3

The adsorption and rinsing operations of example 2 are repeated, but using as the starting membrane membrane $M_1$ modified by polyvinylpyrrolidone obtained at the end of example 2. The PVP contents of the solutions collected, including the permeates, are determined following adsorption and following the rinsing operation. The results obtained are given in Table 1.

On the basis of these results, it can be seen that the quantity of reversibly adsorbed PVP, prior to the rinsing operations, is substantially to that which was adsorbed in example 2. However, the irreversibly adsorbed quantity is much lower, because the saturation conditions of the microporous layer are approached. In Table 1, examples 2 and 3 give the total PVP quantities adsorbed at the end of two consecutive adsorption operations.

EXAMPLE 4

The operating procedure of example 1 is repeated, but using a tubular ultrafiltration membrane $M_4$ of porous carbon coated with a microporous zirconium dioxide layer able to retain compounds having a molecular mass higher than 20 000 daltons. Like that of example 1, membrane $M_4$ is in the form of a 1.20 m long and 0.6 cm internal diameter tube.

The adsorption operations are carried out under the same conditions as in example 1, but using a solution containing 0.098 g/L of PVP in methanol. The polyvinylpyrrolidone contents of the solution collected after adsorption, including the permeate are determined. The results obtained are given in Table 1. On the basis of these results, it can be seen that the adsorbed PVP quantity is higher, which is explained by the porosity characteristics of the starting membrane.

EXAMPLE 5

The operating procedure of example 1 is repeated using for the adsorption operation a methanol solution containing 30 g/L of polyvinylpyrrolidone.

EXAMPLE 6

The operating procedure of example 1 is repeated, using for the adsorption operation a solution of methanol containing 30 g/L of polyvinylimidazole.

EXAMPLE 7

The operating procedure of example 6 is repeated in order to obtain a tubular membrane $M_1$ modified by polyvinylimidazole (PVI) adsorption. The membrane then undergoes a treatment by a 10% by volume epichlorohydrin solution in methanol for 90 minutes at 40° C. in order to quaternize the amine groups of the membrane.

EXAMPLE 8

Ultrafiltration of fresh lactoserum.

In this example use is made of the ultrafiltration installation diagrammatically shown in FIG. 1. This installation comprises an ultrafiltration module 1 constituted by a group of tubes 3 arranged longitudinally in an enclosure 5 between two tube plates 7 and 9, which define within the enclosure 5 a chamber 11 for the introduction of the solution to be treated, a chamber 13 for the discharge of the treated solution and a permeate reception chamber 15, whereby the permeate can be discharged from the installation through a pipe 17.

The solution to be treated can be brought into the ultrafiltration module 1 by pipe 19. On leaving the ultrafiltration module, the solution can be discharged from the installation by pipe 21 provided with a pump 23, which makes it possible to recycle the solution at the intake of the ultrafiltration module 1. A supply of solution to be treated is provided by pipe 25, equipped with pump 27 and part of the treated solution can be discharged through pipe 29.

In this apparatus, the tubes 3 of the ultrafiltration module 1 are constituted by microporous membranes, which have been modified by a hydrophilic polymer or copolymer according to the invention.

The drawing shows a module in which the solution is circulated within tubes, but it would equally well be possible to circulate the solution outside the tubes and in this case the tubes would have been modified in such a way that the $ZrO_2$ separating layer is outside the tube and the hydrophilic polymer is adsorbed on the outer surface of the tubes.

This example makes use of the PVP tubes $M_1$ obtained in example 5 for carrying out the ultrafiltration of fresh lactoserum, which is a mixture of natural proteins more particularly containing beta-lactoglobulin and alpha-lactalbumin.

Thus, circulation takes place in tube 3 via pumps 27,23 and pipes 21,19 of lactoserum, which is a 20 g solution of dry extract containing 1.05 g/L of beta-lactoglobulin and 0.305 g/L of alpha-lactalbumin.

The circulating flow rate in each tube 3 of the module is 500 L/h and the solution leaving the tubes is recycled. The pressure applied in the tubes is 4 bars (0.4 MPa), whilst chamber 15 is at atmospheric pressure, a temperature of 25° C. being used. This operation is carried out for 200 min at the very least and during the operation the flow rate of the ultrafiltrate (or permeate) discharged by pipe 17 is determined. The results obtained are given in Table 2, which also indicates the water flow rates (under 0.4 MPa at 25° C.) through the tubes 3, when they are constituted by an unmodified membrane $M_1$ (example $C_1$), or by a modified membrane $M_1$, whilst in both cases determining the water flow rates $DE_O$ prior to polymer deposition, $DE_P$ following polymer deposition for example 1 only and $DE_f$ after ultrafiltration in both cases.

Following the lactoserum ultrafiltration operation, a periodic determination also takes place of the ultrafiltration flow rates. The results obtained are given in FIG. 2, which represents the ultrafiltration flow rate (in ml/min) as a function of time (in min). In FIG. 2, curve 8 relates to the results obtained in example 8 and curve $C_1$ to the results obtained in example $C_1$. Thus, the ultrafiltration rate decreases as a function of time, but is higher for the PVP-modified membrane $M_1$.

During the ultrafiltration operation, a measurement also takes place of the alpha-lactalbumin content of the permeate, which makes it possible to determine the rejection rate R (in %) of the alpha-lactalbumin, which corresponds to the ratio of the alpha-lactalbumin content of the solution leaving the module on the alpha-lactalbumin content of the starting lactoserum multiplied by 100 and as a function of time.

The results obtained are given in FIG. 3, which is a graph showing the evolution of the rejection rate (in %) of alpha-lactalbumin and as a function of time (in min). In FIG. 3 curve $C_1$ refers to the results obtained with the membrane $M_1$ not modified by polyvinylpyrrolidone and curve 8 refers to the PVP membrane $M_1$.

Thus, the presence of polyvinylpyrrolidone makes it possible to obtain at the outset a non-negligible alpha-lactalbumin level in the permeate and this effect is less pronounced with the unmodified membrane $M_1$.

A chromatographic analysis of the permeate has revealed that it contained no β-lactoglobulin, because the peak corresponding to the latter disappeared in the permeate. This chromatographic analysis was carried out on a Pharmacia Superose 12 column using for elution purposes a $5.10^{-2}M$ phosphate buffer at pH 7, with a flow rate of 0.7 mL/min and carrying out detection at 280 nm.

Thus, the PVP membrane $M_1$ makes it possible to separate α-lactalbumin from β-lactoglobulin and obtain β-lactalbumin-enriched permeates.

EXAMPLE 9

This example makes use of the PVP-modified ultrafiltration membrane obtained in example 4 for the ultrafiltration of fresh lactoserum.

One starts with a 6 g/L dry extract lactoserum and ultrafiltration is carried out under the same conditions as in example 8 for 360 minutes. The results obtained are given in Table 2 and FIGS. 2 and 3, where curves 9 relate to example 9.

On the basis of these results, it can be seen that the type $M_4$ membrane, which retains lower molecular mass molecules than the type $M_1$ membrane retains all the alpha-lactalbumin, but that the ultrafiltration rate is higher than that obtained with the unmodified membrane $M_1$ ($C_1$) and the PVP-modified membrane $M_1$ (curve 8).

EXAMPLE 10

This example uses the membrane of example 6 for carrying out the ultrafiltration of the fresh lactoserum. The same operating procedure as in example 8 is used and the results obtained are given in Table 2 and in FIGS. 2 and 3, where curves 10 relate to example 10. On the basis of these curves, it can be seen that the alpha-lactalbumin rejection rate is lower with the membrane of example 10 and that the ultrafiltration rate is substantially the same as that obtained in example 8 with the PVP-modified membrane $M_1$. In the same way, a chromatographic analysis of the permeate shows that the latter contains no β-lactoglobulin.

Thus, the type $M_1$ membranes modified by polyvinylpyrrolidone deposition and in particular polyvinylimidazole facilitate the transfer of alpha-lactalbumin into the permeate whilst retaining all the beta-lactoglobulin. At the outlet from the ultrafiltration module 1 into pipe 17, it is possible to collect a protein solution only containing α-lactalbumin.

EXAMPLE 11

In this example use is made of the membrane obtained in example 7, i.e. a membrane $M_1$ modified by quaternized PVI in order to carry out the ultrafiltration of the fresh lactoserum. Ultrafiltration takes place under the same conditions as in example 8. The results obtained are given in Table 2 and in FIGS. 4 and 5, which represent the evolution of the retention rate (in %) of alphalactoglobulin (α-La) as a function of time (in min). In this drawing, curve 11 refers to the quaternized PVI-modified membrane $M_1$. Thus, the curve has a very different configuration from that of the curves of FIG. 3. Thus, in the case of this membrane, the retention rate decreases up to 70% at the start of ultrafiltration and then progressively increases to a value of 90 to 95%, which is comparable to the results obtained with other membranes. FIG. 5 shows the evolution of the ultrafiltration flow rate ratio DUF (expressed in $L.h^{-1}.m^{-2}$ under 4 bars)/$DE_P$ as a function of time (in min) obtained with said membrane and curve 11 illustrate$ the variations of this ratio. Thus, the ultrafiltration flow rate is high.

Following said ultrafiltration operation, the membrane undergoes an acid-basic washing cycle and it is reused for carrying out ultrafiltration of the lactoserum under the same conditions as hereinbefore. The results obtained are given in FIGS. 4 and 5, where curves 11' relate to the results obtained after these washing operations. It can be seen that the membrane then has a completely different behaviour. The equilibrium of the retention rate is reached more rapidly and the configuration of the curve 11' corresponds to that of the curves of FIG. 3. The ultrafiltration flow rate ratio $DUF/DE_P$ (water flow rate prior to ultrafiltration) is lower than in the case of the starting membrane, whereas the water flow rate of the membrane reassumes its initial value. Thus, it is assumed that non-protein constituents of the lactoserum have been irreversibly adsorbed during the first ultrafiltration operation carried out with this membrane.

EXAMPLE 12

This example uses the ultrafiltration apparatus shown in FIG. 1 for treating 1 g/L bovine serum albumin (BSA) solutions in the phosphate buffer at pH 7. Under these conditions the BSA is negatively charged like the alpha and beta proteins of the lactoserum.

The membrane is constituted by that obtained in example 5 and ultrafiltration is carried out under the same conditions as in example 8. A determination also takes place of the ultrafiltration flow rates and the water flow rates prior to the deposition of the polymer, following the deposition of the polymer and following ultrafiltration, together with the BSA rejection rate by the membrane.

The results obtained are given in Table 2 and in FIGS. 6 and 7, which respectively represent the ultrafiltration flow rates and the rejection rate or level as a function of time. In these drawings, curve 12 relates to this example, whereas curve C2 relates to the starting membrane $M_1$ not modified by PVP. It can be seen that the presence of PVP improves the passage of the BSA into the permeate, but that the ultrafiltration flow rate is lower.

Table 2 gives the results obtained when using the unmodified membrane $M_1$ under the same conditions (example $C_2$).

The PSA quantity adsorbed on the membrane has been evaluated on the basis of a test carried out with a 0.3 g/L BSA solution. In this case, the BSA quantity adsorbed on the PVP-modified membrane $M_1$ is 0.45 g after 600 min of ultrafiltration, whereas under the same conditions it is 0.75 g for the unmodified membrane $M_1$. Thus, the presence of polymer greatly decreases the BSA protein adsorption.

EXAMPLE 13

This example makes use of the membrane of example 6 for carrying out the ultrafiltration of a BSA solution under the same conditions as in example 12. The results obtained are given in Table 2 and in FIGS. 6 and 7, where curves 13 relate to this example. It can be seen that polyvinylimidazole is more effective than polyvinylpyrrolidone for permitting the passage of BSA and that the ultrafiltration flow rates are higher with PVI than with PVP.

EXAMPLE 14

This example uses the ultrafiltration membrane obtained in example 5 for carrying out the ultrafiltration of a 1 g/L lysozyme solution. This protein is a basic protein (PI=11), which is positively charged under the experimental conditions.

Ultrafiltration is carried out under the same conditions as in example 8. The results obtained are given in Table 2 and in FIGS. 8 and 9, which respectively illustrate the retention rate of the lysozyme and the ultrafiltration flow rates as a function of time. Curves 14 relate to example 14 and curves C3 to the results obtained under the same conditions using an unmodified membrane $M_1$. On the basis of these results, it can be seen that the lysozyme retention rate is lowered by the presence of PVP and this also applies with respect to the ultrafiltration flow rate.

EXAMPLE 15

This example makes use of the membranes used in examples 12 and C2 for the ultrafiltration of a BSA solution as in example 12. Following each ultrafiltration operation, it undergoes regeneration cycles by washing with different reagents in order to establish whether it is possible, following said washing operations, to obtain a water flow rate for the membranes which is substantially identical to that obtained during the first ultrafiltration operation.

To this end, the following successive washing operations are carried out at ambient temperature:
Storage in sodium nitride,
washing with an acid,
alkaline washing and
water washing.

FIG. 10 shows the water flow rate (in $L.h^{-1}.m^{-2}$) of the membranes following these different operations.

Thus, at (33) is essentially obtained the water flow rate (32) of the modified membrane used for the first ultrafiltration operation. Thus, the polymer deposit is stable and the proteins have not been adsorbed in irreversible manner on the membrane.

FIG. 10 also shows the water flow rates (in $L.h^{-1}.m^{-2}$) of a membrane $M_1$ not modified by PVP (example C2) following the different operations of the ultrafiltration of BSA, washing and storage in sodium nitride.

Thus, in this case at (43) is not found the water flow rate (42) of the starting membrane. Thus, certain proteins have irreversibly been adsorbed in membrane $M_1$.

EXAMPLE 16

The operating procedure of example 1 is used for preparing a PVIQ25 ultrafiltration membrane $M_1$, whose separating layer is modified by the adsorption of a quaternized vinylpyrrolidone-vinylimidazole copolymer containing 25% of vinylimidazole.

This modified membrane is then used for the ultrafiltration of a 1 g/L lysozyme solution In a 0.05M phosphate buffer and then for the ultrafiltration of ovalbumin (egg albumin) in the same phosphate buffer and finally for the ultrafiltration of a solution of ovalbumin and lysozyme in the same phosphate buffer, carrying out washing and storage operations between the ultrafiltration operations.

ples 16 and 17 using the modified membrane $M_1$ according to the invention, the water flow rates are substantially the same following the different alkaline and acid washing and ultrafiltration operations. Thus, proteins have been irreversibly adsorbed on the unmodified membrane $M_1$.

TABLE 1

| | | | (PVP) g/l | | PVP | |
|---|---|---|---|---|---|---|
| Ex. | Deposition membrane | Initial solution | Solutions after adsorption | Rinsing solution | Quantity adsorbed before rinsing | Quantity adsorbed after rinsing |
| 1 | $M_1$ (120 cm) | 0.108 | 0.096 | 0.012 | 4.2 mg | 3 mg |
| 2 | $M_1$ (15 cm) | 0.101 | 0.094 | 0.006 | 0.37 mg | 0.19 mg |
| 3 | $M_1$ (15 cm) of Ex. 2 | 0.102 | 0.094 | 0.013 | 0.33 mg | 0.07 mg |
| 2 + 3 | | | | | 0.70 mg | 0.26 mg |
| 4 | $M_4$ (120 cm) | 0.098 | 0.099 | — | 6.2 mg | — |

TABLE 2

| Proteins | Ex. | Membrane | | % R | Permeate Flow rate after 200 min (ml·min$^{-1}$) | Gradient (ml·min$^{-2}$) | Water flow rate (l·h$^{-1}$·m$^2$) DEo before polymer deposition | DEp after polymer deposition | DEf after ultrafiltration |
|---|---|---|---|---|---|---|---|---|---|
| fresh lactoserum (20 g/l) | C1 | M1 | | 95 | 16 | −0.028 | 389 | — | 84 |
| | 8 | M1 + PVP | (ex 5) | 93 | 22 | −0.017 | 675 | 464 | 94 |
| | 9 | M4 + PVP | (ex 4) | 100 | 31 | −0.035 | 265 | 221 | 136 |
| | 10 | M1 + PVI | (ex 6) | 90 | 23 | −0.017 | 500 | 371 | 105 |
| | 11 | M1 + PVIQ | (ex 7) | 87.5 | 22 | −0.037 | 345 | 210 | 59 |
| BSA (1 g/l) | C2 | M1 | | 95 | 48 | −0.062 | 552 | — | 175 |
| | 12 | M1 + PVP | (ex 5) | 90 | 40 | −0.042 | 572 | 319 | 208 |
| | 13 | M1 + PVI | (ex 6) | 83 | 43 | −0.037 | 456 | 342 | 138 |
| Lysozyme (1 g/l) | C3 | M1 | | 93 | 27 | −0.058 | 871 | — | 137 |
| | 14 | M1 + PVP | | 85 | 22 | −0.023 | 600 | 460 | 120 |

FIG. 11 shows the water flow rates of said membrane prior to the adsorption of PVIQ25 and following each of the ultrafiltration and washing operations. It can be seen that at (53) is substantially found the water flow rate (52) of the membrane modified by PVIQ25 and washed.

EXAMPLE 17

This example makes use of the PVIQ ultrafiltration membrane $M_1$ obtained in example 7, namely a membrane $M_1$ modified by polyvinylimidazole adsorption and which is then quaternized, for the successive ultrafiltration of lysozyme and fresh lactoserum respectively using the conditions of example 8 and following each ultrafiltration operation by acid and basic washing operations and possibly a storage.

FIG. 11 shows the water flow rates of this membrane following the different ultrafiltration, washing and storage operations. It can be seen that at (63) is obtained the water flow rate (62) of the starting PVIQ membrane $M_1$.

COMPARATIVE EXAMPLE 4

This example uses the initial tubular membrane $M_1$ for carrying out the ultrafiltration of lysozyme under the same conditions as those of example 14. Following each ultrafiltration operation, the membrane undergoes acid and basic washing operations and optionally a storage. The water flow rates of the membrane after each operation are given in FIG. 11.

FIG. 11 shows that the water flow rate (72) of the starting membrane $M_1$ constantly decreases during the ultrafiltration operations, whereas in the case of examples 16 and 17 using the modified membrane $M_1$ according to the invention, the water flow rates are substantially the same following the different alkaline and acid washing and ultrafiltration operations. Thus, proteins have been irreversibly adsorbed on the unmodified membrane $M_1$.

We claim:

1. Inorganic ultrafiltration or microfiltration membrane having an inorganic material separating layer, characterized in that it comprises, prior to use for an ultrafiltration or microfiltration operation, at least one hydrophilic polymer or copolymer with a molecular mass equal to 20,000 to 70,000 daltons, adsorbed on or in the separating layer of the inorganic membrane, thereby modifying the separating properties thereof, the average pore radius of the membrane being from 50 to 100 Angstroms, and the hydrophilic polymer or copolymer adsorbed on or in the separating layer being 7 to 400 $\mu$g/cm$^2$ of membrane.

2. Membrane according to claim 1, characterized in that the hydrophilic polymer or copolymer is a polymer having N-disubstituted amide functions.

3. Membrane according to claim 2, characterized in that the polymer or copolymer having amide functions is chosen from the group including polyvinylpyrrolidone, N-disubstituted polyacrylamide and N-disubstituted polymethacrylamide.

4. Ultrafiltration membrane according to claim 1, characterized in that the hydrophilic polymer or copolymer is a polymer having amine functions.

5. Membrane according to claim 4, characterized in that the polymer having amine functions is chosen from the group including polyvinylimidazole, polyvinylamine and polyethyleneimines.

6. Membrane according to any one of the claims 1 to 5, characterized in that it is constituted by a porous carbon support coated with a microporous metal oxide layer on or in which is adsorbed the hydrophilic polymer or copolymer.

7. Membrane according to any one of the claims 1 to 5, characterized in that it is constituted by a macroporous metal oxide support coated with a microporous metal oxide layer on or in which is adsorbed the hydrophilic polymer or copolymer.

8. Membrane according to claim 6, characterized in that the hydrophilic polymer is polyvinylpyrrolidone or polyvinylimidazole.

9. Membrane according to claim 6, characterized in that the metal oxide is alumina or zirconia or titanium dioxide.

10. Process for the preparation of an ultrafiltration or microfiltration membrane according to any one of the claims 1 to 5, comprising contacting the inorganic material separating layer of an inorganic ultrafiltration or microfiltration membrane with a solution of at least one hydrophilic polymer or copolymer with a molecular mass at the most equal to $10^5$ for a time adequate for adsorbing the hydrophilic polymer or copolymer on or in the separating layer of the inorganic membrane.

11. Process according to claim 10, characterized in that the inorganic membrane is firstly conditioned in a solvent identical to that which will be used in the hydrophilic polymer or copolymer solution.

12. Process according to claim 11, characterized in that the solvent is methanol.

13. Process for separating the proteins present in a solution, comprising subjecting the solution to ultrafiltration using as the ultrafiltration membrane the membrane according to any one of the claims 1 to 5.

14. Process according to claim 13, characterized in that the proteins to be separated are α-lactalbumin and β-lactoglobulin.

15. Process according to claim 13, characterized in that the proteins to be separated are bovine serum albumin.

16. Process according to claim 13, characterized in that the proteins to be separated are lysozyme.

* * * * *